United States Patent
Kim et al.

(10) Patent No.: US 10,924,956 B2
(45) Date of Patent: Feb. 16, 2021

(54) BEAM INFORMATION REPORTING METHOD FOR MULTI-USER MIMO TRANSMISSION IN WIRELESS COMMUNICATION SYSTEM AND APPARATUS THEREFOR

(71) Applicant: LG Electronics Inc., Seoul (KR)

(72) Inventors: Hyungtae Kim, Seoul (KR); Jonghyun Park, Seoul (KR); Kijun Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/475,610

(22) PCT Filed: Jan. 3, 2018

(86) PCT No.: PCT/KR2018/000117
§ 371 (c)(1),
(2) Date: Jul. 2, 2019

(87) PCT Pub. No.: WO2018/128384
PCT Pub. Date: Jul. 12, 2018

(65) Prior Publication Data
US 2019/0327632 A1    Oct. 24, 2019

Related U.S. Application Data

(60) Provisional application No. 62/441,895, filed on Jan. 3, 2017.

(51) Int. Cl.
*H04W 4/00* (2018.01)
*H04W 24/10* (2009.01)
(Continued)

(52) U.S. Cl.
CPC .......... *H04W 24/10* (2013.01); *H04B 7/0452* (2013.01); *H04B 7/0695* (2013.01);
(Continued)

(58) Field of Classification Search
None
See application file for complete search history.

(56) References Cited

U.S. PATENT DOCUMENTS

| | | | |
|---|---|---|---|
| 9,985,706 B1* | 5/2018 | Freedman | H04B 7/1851 |
| 2004/0014429 A1* | 1/2004 | Guo | H04B 7/0632 |
| | | | 455/73 |

(Continued)

FOREIGN PATENT DOCUMENTS

KR    20130127347    11/2013

OTHER PUBLICATIONS

Catt, "QCL between CSI-RS for beam management," R1-1611388, 3GPP TSG RAN WG1 Meeting #87, Reno, USA, Nov. 14-18, 2016, 3 pages.

(Continued)

*Primary Examiner* — Clemence S Han
(74) *Attorney, Agent, or Firm* — Fish & Richardson P.C.

(57) ABSTRACT

Disclosed is a method by which a terminal reports beam information to a base station in a wireless communication system. The method comprises the steps of: receiving, from the base station, a beam measurement reference signal corresponding to each of a plurality of candidate transmission beams; determining at least one best transmission beam among the plurality of candidate transmission beams on the basis of the beam measurement reference signal; determining at least one worst transmission beam corresponding to each of the at least one best transmission beam among the plurality of candidate transmission beams by using a best reception beam corresponding to the at least one best transmission beam among candidate reception beams; reporting, to the base station, information on the at least one
(Continued)

best transmission beam and the at least one worst transmission beam corresponding to the at least one best transmission beam.

6 Claims, 11 Drawing Sheets

(51) Int. Cl.
*H04B 7/0452* (2017.01)
*H04B 7/06* (2006.01)
*H04L 5/00* (2006.01)
*H04W 72/04* (2009.01)
*H04W 88/02* (2009.01)

(52) U.S. Cl.
CPC ........... *H04L 5/005* (2013.01); *H04W 72/046* (2013.01); *H04W 88/02* (2013.01)

(56) References Cited

U.S. PATENT DOCUMENTS

| | | | | |
|---|---|---|---|---|
| 2011/0319092 A1* | 12/2011 | Kim | ..................... | H04B 7/0452 455/452.1 |
| 2013/0172002 A1* | 7/2013 | Yu | ....................... | H04B 7/0617 455/452.1 |
| 2014/0286291 A1* | 9/2014 | Einhaus | ................. | H04B 7/024 370/329 |
| 2015/0245225 A1* | 8/2015 | Takahashi | ............ | H04B 7/0695 455/67.11 |
| 2016/0028519 A1* | 1/2016 | Wei | ...................... | H04B 7/0456 375/267 |
| 2016/0269093 A1* | 9/2016 | Seol | ........................ | H04B 7/043 |
| 2017/0311187 A1* | 10/2017 | Dong | ................... | H04B 7/0408 |
| 2018/0084585 A1* | 3/2018 | Lee | ........................ | H04W 48/20 |
| 2018/0103407 A1* | 4/2018 | Nagaraja | ............... | H04W 24/02 |

OTHER PUBLICATIONS

ZTE, ZTE Microelectronics, "Beam selection and CSI acquisition for NR MIMO," R1-1611417, 3GPP TSG RAN WG1 Meeting #87, Reno, U.S.A., Nov. 14-18, 2016, 6 pages.

Huawei, HiSilicon, "DL RS Design for NR Beam Management," R1-1611242, 3GPP TSG RAN WG1 Meeting #87, Reno, NV, USA, Nov. 14-18, 2016, 5 pages.

PCT International Search Report and Written Opinion in International Application No. PCT/KR2018/000117, dated Apr. 24, 2018, 19 pages. (with English translation).

* cited by examiner (a) Control-plane protocol stack (b) User-plane protocol stack

BEAM INFORMATION REPORTING METHOD FOR MULTI-USER MIMO TRANSMISSION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/000117, filed on Jan. 3, 2018, which claims the benefit of U.S. Provisional Application No. 62/441,895, filed on Jan. 3, 2017. The disclosures of the prior applications are incorporated by reference in their entirety.

TECHNICAL FIELD

The present disclosure relates to a wireless communication system, and more particularly, a method of reporting beam information for multi-user Multiple-Input and Multiple-Output (MIMO) transmission in a wireless communication system and apparatus therefor.

BACKGROUND ART

As an example of a mobile communication system to which the present disclosure is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNodeBs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARD)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the above discussion, the present disclosure provides a method of reporting beam information for multi-user MIMO transmission in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of reporting beam information by a User Equipment (UE) to a base station in a wireless communication system. The method may include: receiving, from the base station, beam measurement reference signals respectively corresponding to a plurality of candidate transmission beams; determining at least one best transmission beam among the plurality of candidate transmission beams based on the beam measurement reference signals; determining at least one worst transmission beam corresponding to the at least one best transmission beam among the plurality of candidate transmission beams, using a best reception beam corresponding to the at least one best transmission beam among candidate reception beams; and reporting, to the base station, information on the at least one best transmission beam and information on the at least one worst transmission beam corresponding to the at least one best transmission beam.

In another aspect of the present disclosure, provided is a User Equipment (UE) in a wireless communication system. The UE may include: a wireless communication module; and a processor connected to the wireless communication module. The processor may be configured to: determine at least one best transmission beam among a plurality of candidate transmission beams based on beam measurement reference signals received from a base station, wherein the beam measurement reference signals correspond to the plurality of candidate transmission beams, respectively; determine at least one worst transmission beam corresponding to the at least one best transmission beam among the plurality of candidate transmission beams, using a best reception beam corresponding to the at least one best transmission beam among candidate reception beams; and control the wireless communication module to report, to the base station, information on the at least one best transmission beam and information on the at least one worst transmission beam corresponding to the at least one best transmission beam.

Preferably, the information on the at least one worst transmission beam corresponding to the at least one best transmission beam may include information on the number of the at least one worst transmission beam.

Alternatively, the information on the at least one worst transmission beam corresponding to the at least one best transmission beam may include information on a common worst transmission beam among the at least one worst transmission beam corresponding to the at least one best transmission beam.

Further, the UE or the processor of the UE may be configured to determine, as the at least one worst transmission beam, a transmission beam with a predetermined metric less than or equal to a threshold among the plurality of candidate transmission beams except the at least one best transmission beam on an assumption that the at least one best transmission beam and the reception beam corresponding thereto are applied.

In this case, the threshold may be configured to increase as a preference ranking of the at least one best transmission beam increases.

Advantageous Effects

According to the present disclosure, beam information for multi-user MIMO transmission, and more particularly, information on the best and worst transmission beams can be efficiently reported in a wireless communication system.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE

Hereinafter, the structures, operations, and other features of the present disclosure will be understood readily from the embodiments of the present disclosure, examples of which are described with reference to the accompanying drawings. The embodiments which will be described below are examples in which the technical features of the present disclosure are applied to a 3GPP system.

Although the embodiments of the present disclosure will be described based on an LTE system and an LTE-Advanced (LTE-A) system, the LTE system and the LTE-A system are only exemplary and the embodiments of the present disclosure can be applied to all communication systems corresponding to the aforementioned definition. In addition, although the embodiments of the present disclosure will herein be described based on Frequency Division Duplex (FDD) mode, the FDD mode is only exemplary and the embodiments of the present disclosure can easily be modified and applied to Half-FDD (H-FDD) mode or Time Division Duplex (TDD) mode.

Figure 1:
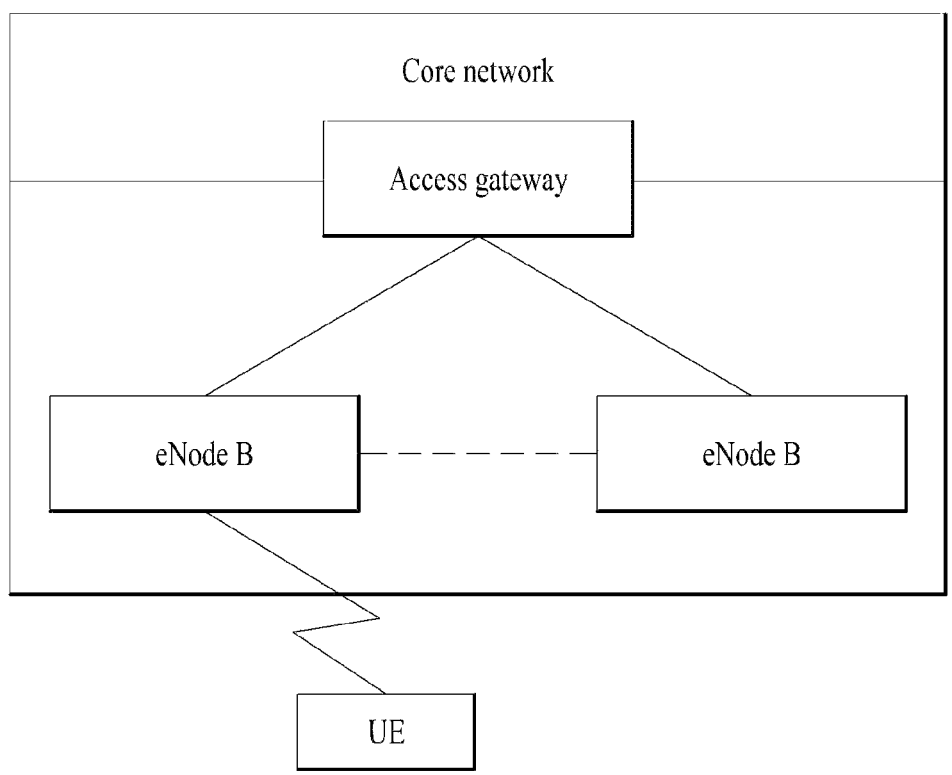
FIG. 1 is a diagram schematically illustrating a network structure of an E-UMTS as an exemplary radio communication system.
Figure 2:
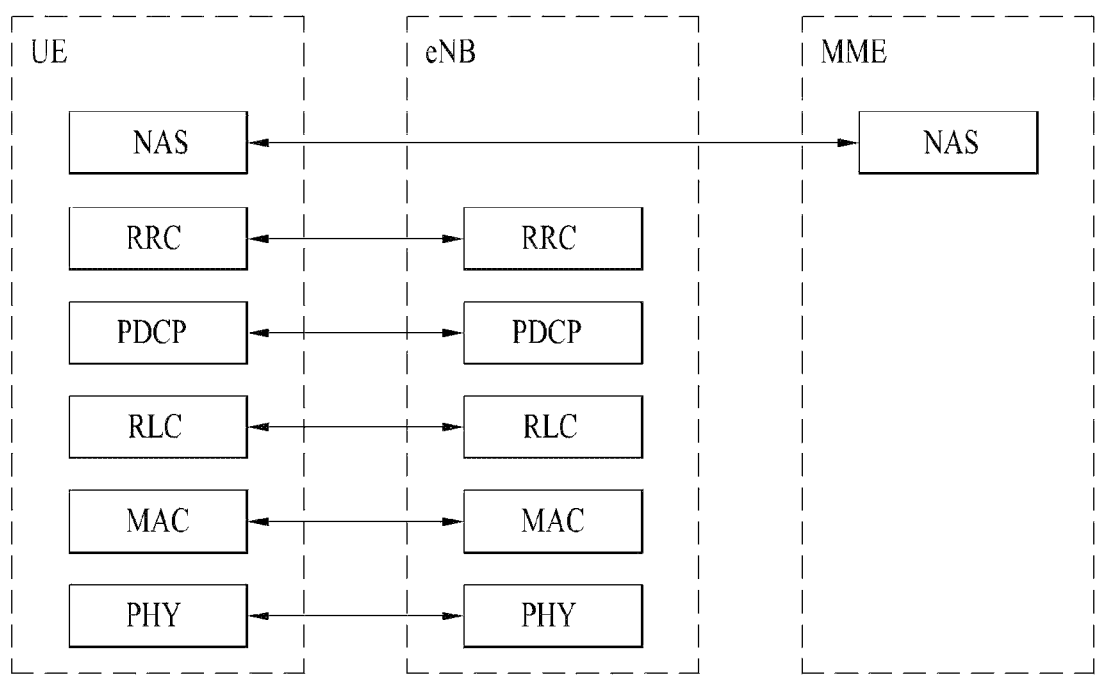
FIG. 2 is a diagram illustrating structures of a control plane and a user plane of a radio interface protocol between a UE and an E-UTRAN based on the 3GPP radio access network specification.
Figure 2:
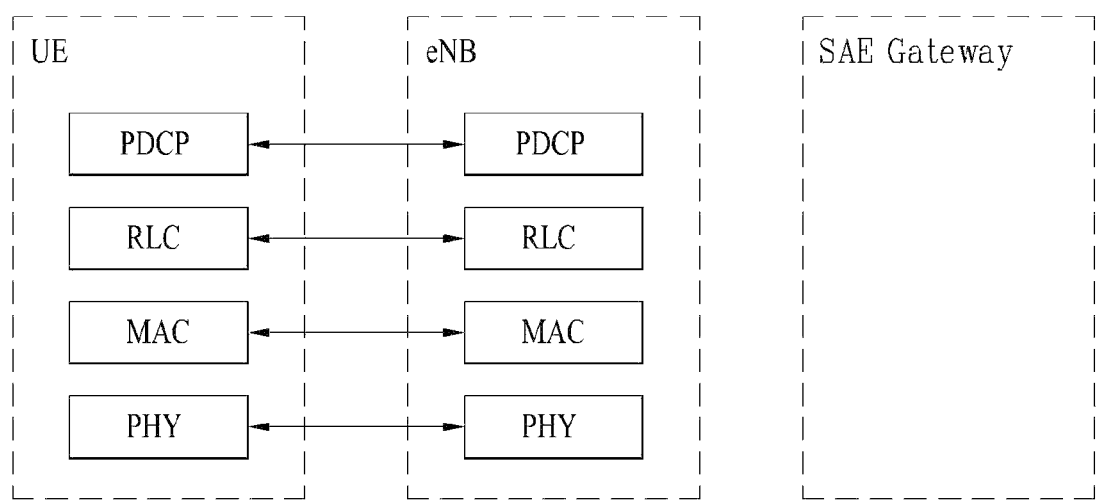

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC.

A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
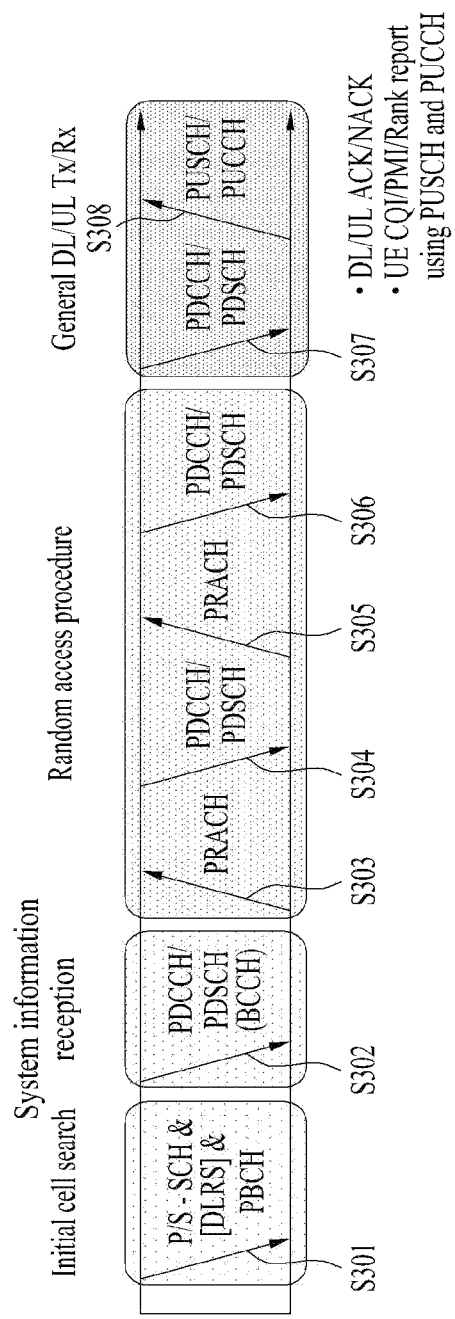
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305) and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
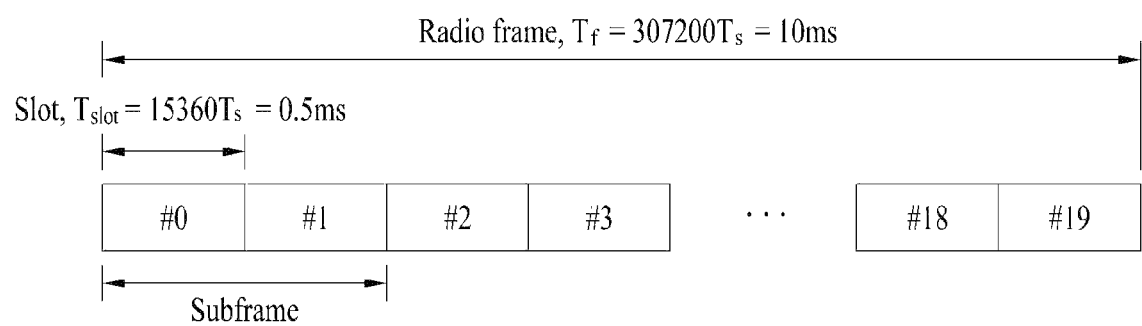
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by $Ts=1/(15 \text{ kHz} \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
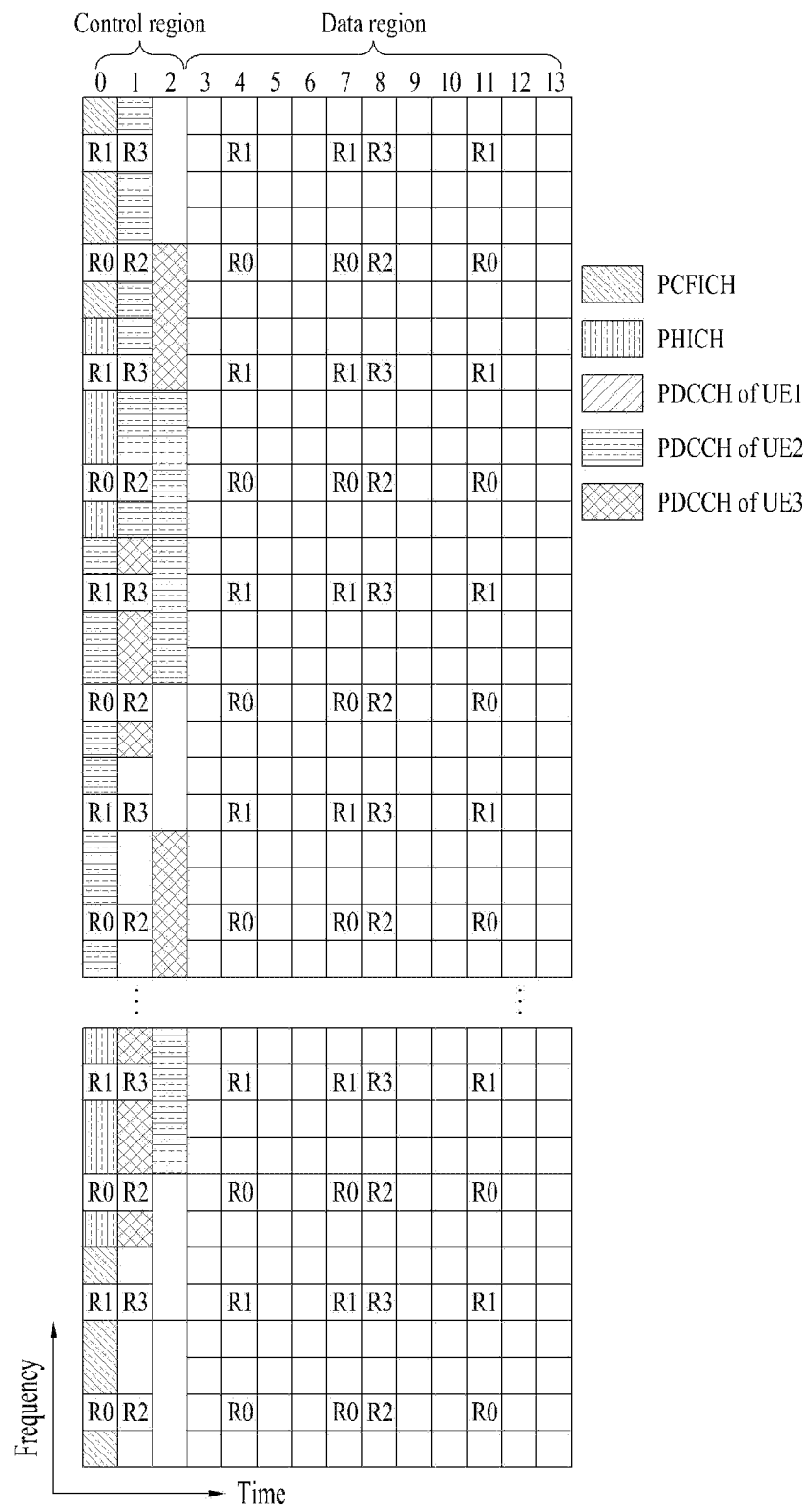
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
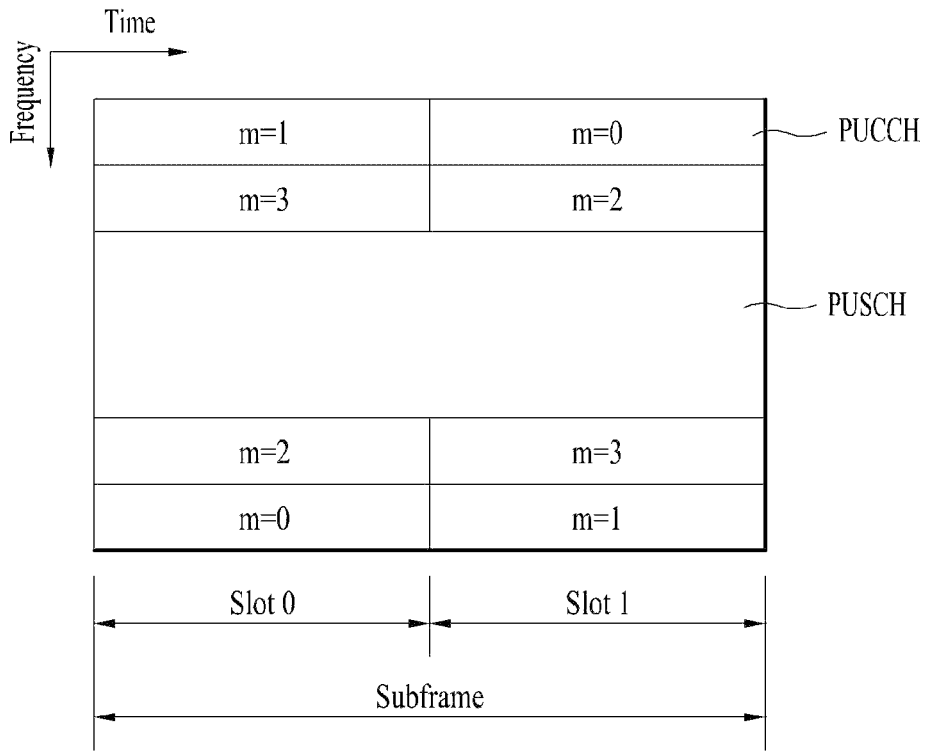
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may be also referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
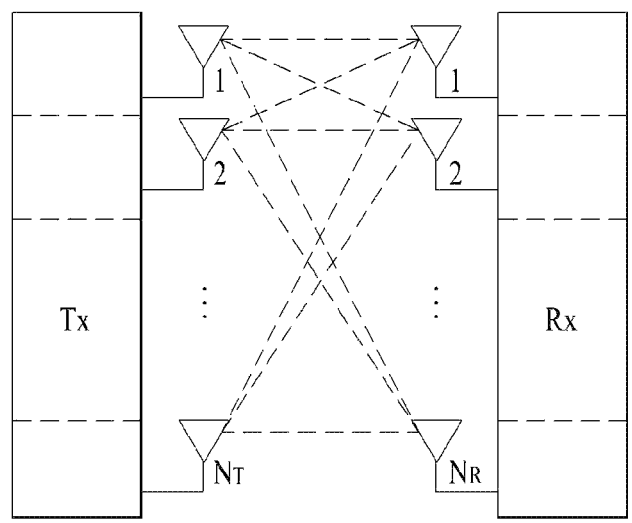
FIG. 7 is a diagram illustrating a configuration of a general MIMO communication system.

The configuration of a general MIMO communication system is shown in FIG. 7.

A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector ŝ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1 W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \quad \text{[Equation 9]}$$

where $X_i$ is $NT/2$ by $M$ matrix.

$$W2(j) = \begin{bmatrix} \overbrace{e_M^k \quad e_M^l \quad \cdots \quad e_M^m}^{r \text{ columns}} \\ \alpha_j e_M^k \quad \beta_j e_M^l \quad \gamma_j e_M^m \end{bmatrix}$$

-continued (if rank = $r$), where $1 \le k, l, m \le M$ and $k, l, m$ are integer.

Here, NT indicates the number of Tx antennas. M is the number of columns of the matrix Xi and indicates that total M candidate column vectors exist in the matrix Xi. Moreover, ekM, elM and emM indicate kth, lth and mth column vectors of Xi, respectively as column vectors, in which kth, lth and mth elements correspond to 1 and the rest of elements correspond to 0 among M elements. αj, βj, and γj are complex values having unit norms and indicate that, when kth, lth and mth column vectors of the matrix Xi are selected, phase rotations are applied to the selected column vectors, respectively. Here, i is an integer equal to or greater than 0 and indicates a PMI index indicating W1. And, j is an integer equal to or greater than 0 and indicates a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad [\text{Equation 10}]$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

In the LTE system, as described above, Channel State Information (CSI) includes CQI, PMI, RI and the like, by which the CSI is non-limited. According to a transmission mode of each UE, CQI, PMI and RI may be transmitted all or in part. A case of transmitting CSI periodically is called a periodic reporting. A case of transmitting CSI in response to a request made by a base station is called an aperiodic reporting.

In case of the aperiodic reporting, a request bit included in UL scheduling information downloaded by a base station is transmitted to a UE. Thereafter, the UE delivers CSI considering a transmission mode of the UE to the base station through a UL data channel (PUSCH).

In case of the periodic reporting, a period, an offset in the corresponding period and the like are signaled per UE in subframe unit in a semi-static manner through a higher layer signal. Each UE delivers CSI considering a transmission mode to a base station according to a determined period through a UL control channel (PUCCH). If UL data simultaneously exists in a CSI transmitted subframe, CSI is transmitted through UL data channel (PUSCH) together with the data.

A base station transmits transmission timing information suitable for each UE to the corresponding UE by considering a channel status of each UE, a UE distribution status and the like. The transmission timing information includes a period, offset and the like for transmitting CSI and can be transmitted to each UE through an RRC message.

Cooperative Multipoint Transmission/Reception (CoMP) is described as follows.

A system since LTE-A intends to employ a method of increasing performance of a system by enabling cooperation among multiple cells. Such a method is called Cooperative Multipoint Transmission/Reception (CoMP). CoMP indicates a method that two or more base stations, access points or cells communicate with a UE cooperatively in order to perform communication between a specific UE and a base station, access point or cell more smoothly. In the present disclosure, a base station, an access or a cell may be used in the same sense.

Generally, in a multi-cell environment having a frequency reuse factor set to 1, performance and average sector throughput of a UE located on a cell-edge may be lowered due to Inter-Cell Interference (ICI). In order to reduce such ICI, a legacy LTE system employs a method of enabling a UE located on a cell-edge to have an appropriate throughput in an environment restricted by interference using a simple manual scheme such as Fractional Frequency Reuse (FFR) through a UE-specific power control. Yet, it may be more preferable to reduce ICI or reuse ICI as a signal desired by a UE rather than to lower a frequency resource use per cell. To achieve such an object, a CoMP transmission scheme is applicable.

A CoMP transmission scheme can be categorized into a CoMP-Joint Processing (CoMP-JP) scheme that is a cooperative MIMO type joint processing through data sharing and a CoMP-Coordinated Scheduling/Beamforming (CoMP-CS/CB) scheme.

In case of Downlink (DL), in a joint processing (CoMP-JP) process, a UE can simultaneously receive data from a plurality of base stations performing CoMP transmission scheme and is able to improve reception performance by combining signals respectively received from the base stations (Joint Transmission (JT)). Moreover, it is able to consider a method that one of base stations performing a CoMP transmission scheme transmits data to a UE at a specific timing (Dynamic Point Selection (DPS). In case of Coordinated Scheduling/Beamforming (CoMP-CS/CB) scheme, a UE can receive data instantaneously through a single base station, i.e., a serving base station.

In case that Joint Processing (CoMP-JP) scheme is applied in Uplink (UL), a plurality of base stations can simultaneously receive PUSCH signal from a UE (Joint Reception (JR)). On the contrary, in case of Coordinated Scheduling/Beamforming (CoMP-CS/CB) scheme, a single base station can receive PUSCH. Decision to use Coordinated Scheduling/Beamforming (CoMP-CS/CB) scheme can be made by coordinated cells (or base stations).

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
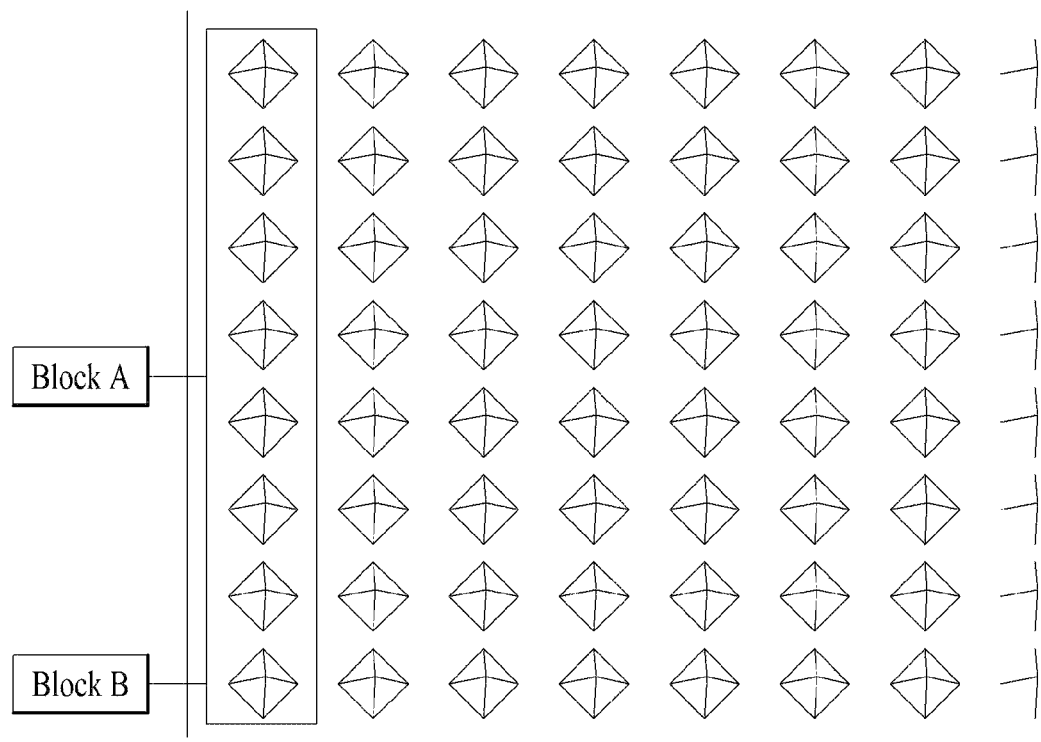
FIG. 8 is a diagram illustrating implementation of a 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is expected to be constructed as a system having a plurality of antennas by installing antennas in a vertical direction and a horizontal direction.

In a Millimeter Wave (mmW) system, since a wavelength is shortened, a plurality of antennas can be installed in the same area. That is, considering that the wavelength in the 30 GHz band is 1 cm, a total of 64 (8×8) antenna elements may be installed in a 4 by 4 cm panel at intervals of 0.5 lambda (wavelength) in the case of a 2-dimensional array. Therefore, in the mmW system, it is attempted to improve coverage or throughput by increasing beamforming (BF) gain using multiple antenna elements.

If each antenna element is equipped with a Transceiver Unit (TXRU) to enable adjustment of transmission power and phases per antenna element, independent BF may be performed for each frequency resource. However, installing TXRUs in all about 100 antenna elements is less feasible in terms of cost. Therefore, a method of mapping a plurality of antenna elements to one TXRU and adjusting the direction of a beam using an analog phase shifter has been considered. However, such an analog BF method is disadvantageous in that frequency selective BF is impossible because only one beam direction is generated over the full band.

As an intermediate form of digital BF and analog BF, hybrid BF with B TXRUs fewer than Q antenna elements may be considered. In the case of the hybrid BF, the number of beam directions that can be transmitted at the same time is limited to B or less although it depends on how the B TXRUs and the Q antenna elements are connected.

Figure 9:
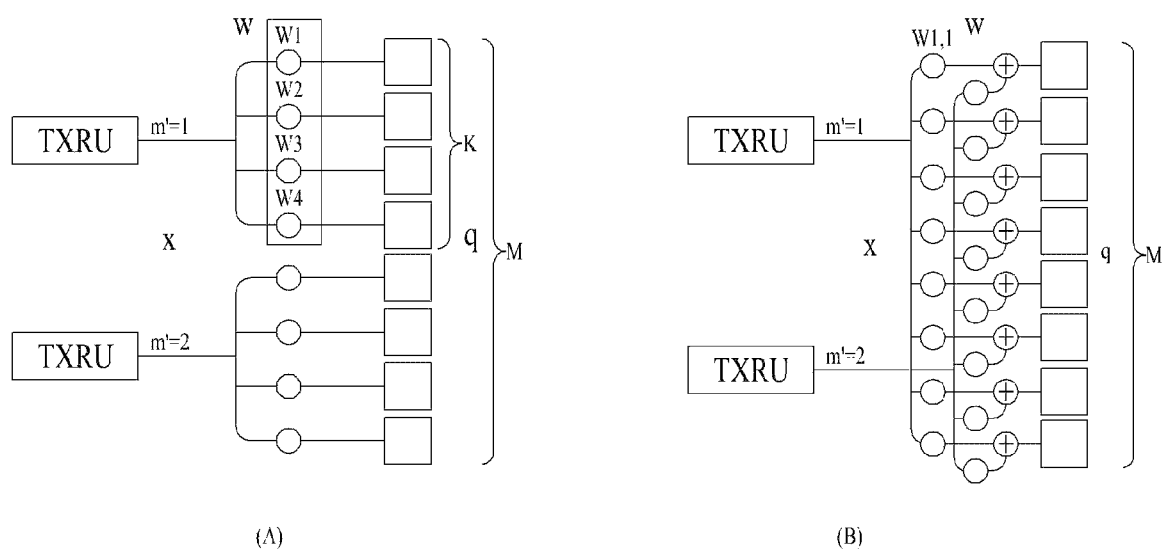
FIG. 9 is a diagram illustrating methods of connecting TXRUs and antenna elements.

FIG. 9 illustrates methods of connecting TXRUs and antenna elements.

Specifically, FIG. 9 (a) shows a method of connecting a TXRU to a sub-array. In this case, each antenna element is connected to one TXRU. In contrast to FIG. 9 (a), FIG. 9 (b) shows a method of connecting a TXRU to all antenna elements. In this case, each antenna element is connected to all TXRUs. In FIG. 9, W indicates a phase vector multiplied by means of an analog phase shifter. That is, the direction of analog BF is determined by W. In this case, CSI-RS antenna ports may be mapped one-to-one or one-to-many to TXRUs.

In mmW bands, a PDSCH may be transmitted in one analog-beam direction at one instant due to analog beamforming. As a result, a base station may transmit data only to some UEs located along the corresponding direction. However, if necessary, the base station may configure a different analog-beam direction per antenna port to simultaneously transmit data to multiple UEs located along a plurality of analog-beam directions.

Figure 10:
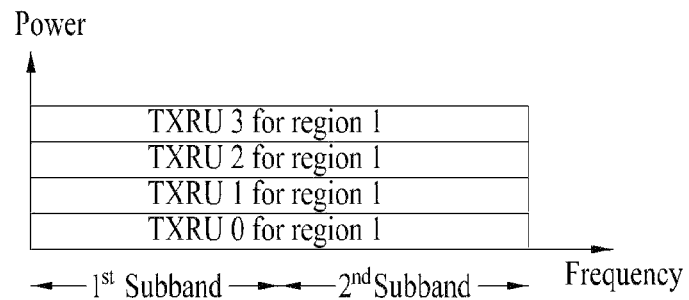
FIGS. 10 to 12 are diagrams illustrating a serving region per TXRU.
Figure 11:
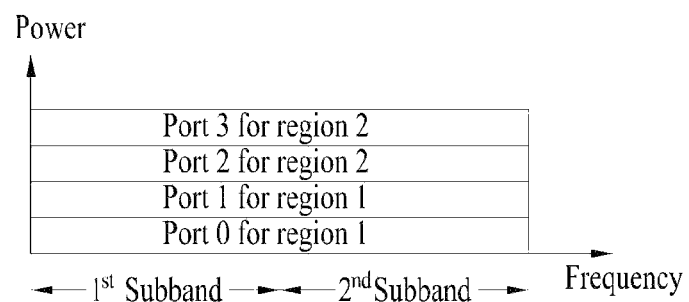
Figure 12:
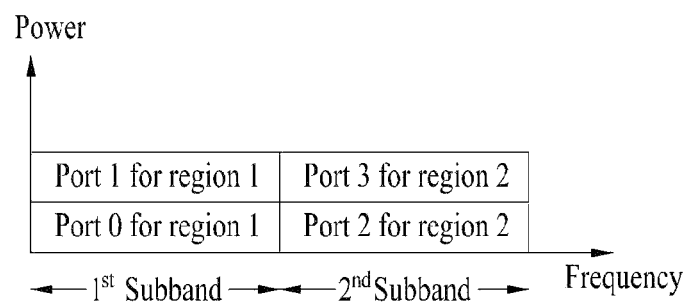

FIGS. 10 to 12 are diagrams illustrating a serving region per TXRU. In particular, it is assumed in FIGS. 10 to 12 that 256 antenna elements are divided into 4 sub-arrays and the structure of FIG. 9 (a) where a TXRU is connected to a sub-array is used. If each sub-array is a 2-dimensional array and consists of a total of 64 (8×8) antenna elements, analog beamforming may enable each sub-array to cover a region corresponding to both a 15-degree horizontal angle region and a 15-degree vertical angle region. That is, a base station may divide a region that the base station should serve into a plurality of regions and serve the divided regions one at a time. In the following, it is assumed that CSI-RS antenna ports are 1-to-1 mapped to TXRUs, and therefore, an antenna port may mean a TXRU.

When all TXRUs (antenna ports or sub-arrays) have the same analog-beamforming direction as shown in FIG. 10, the base station may form a digital beam with higher resolution, thereby increasing the throughput of a corresponding region. In addition, the base station may increase the rank of data transmitted to the corresponding region, thereby increasing the throughput of the corresponding region.

When TXRUs (antenna ports or sub-arrays) have different analog-beamforming directions as shown in FIG. 11, the base station may simultaneously transmit data to UEs distributed in a wide region in a corresponding subframe. For example, among the four antenna ports of shown in FIG. 11, two antenna ports may be used to transmit a PDSCH to UE 1 in region 1, and the other two antenna ports may be used to transmit a PDSCH to UE 2 in region 2. FIG. 11 illustrates an example in which Spatial Division Multiplexing (SDM) is applied between PDSCH 1 transmitted to UE 1 and PDSCH 2 transmitted to UE 2. However, unlike FIG. 11, Frequency Division Multiplexing (FDM) may be applied between PDSCH 1 transmitted to UE 1 and PDSCH 2 transmitted to UE 2 as shown in FIG. 12.

To maximize cell throughput, either the method of serving one region using all antenna ports or the method of simultaneously serving multiple regions by dividing antenna ports may be determined according to the rank and modulation and coding scheme (MCS) provided to each UE. In addition, the preferred method may also be determined based on the amount of data to be transmitted to each UE.

The base station calculates cell throughput or a scheduling metric that can be obtained when serving one region using all antenna ports and cell throughput or a scheduling metric that can be obtained when serving two regions by dividing the antenna ports. Then, the base station compares the cell throughput and scheduling metrics obtained using the two different methods and selects a final transmission method. That is, the number of antenna ports used for PDSCH transmission is changed on a subframe basis. To calculate the transmission MCS of a PDSCH according to the number of antenna ports and reflect the MCS in a scheduling algorithm, the base station requires CSI feedback from an appropriate UE.

In the legacy LTE system, analog beamforming has been regarded to be static or semi-static, and MU-MIMO transmission using only digital beamforming has been considered. However, in New RAT (NR), hybrid beamforming where the analog beamforming and digital beamforming are combined is under discussion. In addition, a base station may receive feedback on the analog beamforming from UEs in a beam management procedure and flexibly manage the analog beamforming. Considering the above features of the NR, the present disclosure proposes base station operation and UE operation for Multi-User (MU) MIMO transmission using the analog beamforming.

According to the present disclosure, for analog-beam-level MU-MIMO, a UE reports the best and worst transmission (Tx) beams in the beam management procedure. Hereinafter, the base station operation and the UE operation will be described.

<Base Station Operation>

A UE reports the best and worst Tx beams to a base station. Additionally, the UE may report a reception (Rx) beam corresponding to the best Tx beam.

If interference occurs due to the worst Tx beam from the perspective of one UE, the amount of interference caused to the UE is small. Accordingly, the worst Tx beam may mean the best interference Tx beam for the UE. For example, assuming that UE 2 reports as its worst Tx beam the best Tx beam of UE 1 and UE 1 reports as its worst Tx beam the best Tx beam of UE 2, interference therebetween may be minimized by performing MU-MIMO scheduling for the two UEs.

Based on Tx beams reported by UEs, the base station selects a MU-MIMO UE pair using different Tx beams. To reflect the MU interference between UE 1 and UE 2 in an MCS, the base station imposes interference of UE 2 (interference caused by the worst Tx beam) on CSI-IM of UE 1 such that the interference of UE 2 is reflected in a CQI of UE 1 (the same operation is applied to a CQI of UE 2). Then, the base station configures the MCS using the MU-CQI and performs MU-MIMO transmission for UE 1 and UE 2.

Here, UE 1 (or UE 2) may correspond to one or multiple UEs. When UE 1 (or UE 2) corresponds to multiple UEs, MU-MIMO may be scheduled between the multiple UEs using digital beamforming. For example, the base station may transmit MU-MIMO to UE 1a and UE 1b which report the same worst/best Tx beam and at the same time transmit MU-MIMO to UE 2a and UE 2b which report the same worst/best Tx beam different from the worst/best Tx beam reported by UE 1a and UE 1b. That is, a group consisting of UE 1a and UE 1b and a group consisting of UE 2a and UE 2b may be defined as UE 1 and UE 2, respectively, and (analog-beamformed) Tx beams are used to minimize the interference therebetween. In addition, as in the conventional MU-MIMO, (digital beamforming) PMIs are used to minimize interference between UE1a and UE 1b and interference between UE 2a and UE 2b.

In addition to the best/worst Tx beam, information on rankings of beams is reported to the base station. For example, a UE may define a Tx beam capable of attaining the highest metric (for example, received power of an RS for beam measurement, a ratio between received power of an RS for beam measurement and interference power, etc.) as the first best beam and a Tx beam capable of attaining the second highest metric as the second best beam. Then, the UE may report multiple best beams together with the ranking information. The base station may consider various MU-MIMO combinations using the corresponding information and, as a result, achieve high scheduling flexibility.

<UE Operation>

First, a method in which a UE calculates the worst Tx beam will be described.

When one UE has multiple Rx beam candidates, the metric ranking of a Tx beam may vary per Rx beam. This is because the reception intensity of a Tx beam may depend on the direction of an Rx beam. Thus, the best Tx beam and an Rx beam optimized for the best Tx beam should be determined as a pair, and the Rx beam is referred to as the best Rx beam.

When multiple best Tx beams, for example, the first to N-th best Tx beams (where the value of N is transmitted by a base station to the UE) are reported, each of the best Tx beams may have its own best Rx beam. Herein, an Rx beam paired with the n-th best Tx beam is referred to as the n-th best Rx beam.

Since the best Rx beam may vary depending on the best Tx beam, the worst Tx beam may also vary depending on the best Tx beam. For example, the worst Tx beam for a pair consisting of the first Tx and Rx beams may be different from the worst Tx beam for a pair consisting of the second Tx and Rx beams. The UE should calculate and report the worst Tx beam for each pair of best Tx and Rx beams. If a metric is calculated by comparing available Rx beam candidates for each Tx beam, the amount of calculation may increase. However, in this case, an increase in the amount of calculation may not be problematic due to the following reasons: unlike a normal CSI reporting procedure, the beam management procedure does not require a PMI or an RI and measures only a CQI based on one port; and the number of Rx beams is less than the number of Tx beams.

Thus, when reporting the first to N-th best Tx beams, the UE should calculate/report the worst Tx beam for each of the best Tx beams. Alternatively, when reporting the first to N-th best Tx beams, the UE should calculate/report the worst Tx beam for each best Rx beam.

Alternatively, when reporting the first to N-th best Tx/Rx beams, the UE may calculate/report worst Tx beams for some of the best Tx/Rx beams. For example, when reporting the first to N-th best Tx beams, the UE may calculate/report worst Tx beams only for the first and second best Tx beams and skip the calculation/reporting for the remaining n-th best Tx beams.

Alternatively, when reporting the first to N-th best Tx/Rx beams, the UE may calculate/report the common worst Tx beam of all of the first to N-th best Tx/Rx beams instead of calculating/reporting the worst Tx beam for each of the best Tx/Rx beams.

For example, the UE may calculate/report the union of at least one worst Tx beam corresponding to the first best Tx beam and at least one worst Tx beam corresponding to the second best Tx beam as the common worst Tx beam. By doing so, although the base station may not accurately know the worst Tx beam for each of the best Tx beams, the base station may still obtain information on the UE's worst Tx beams and perform MU-MIMO transmission based on the information. As another example, the UE may calculate/report the intersection of at least one worst Tx beam corresponding to the first best Tx beam and at least one worst Tx beam corresponding to the second best Tx beam as the common worst Tx beam. Since the number of worst Tx beams included in the intersection is smaller than the number of worst Tx beams included in the union, the intersection is disadvantageous in that the number of candidates of MU-MIMO pairs of the base station decreases. However, since the intersection includes the worst Tx beams for all the best Tx beams, it may provide the base station with accurate information, compared to the union.

Alternatively, the UE may calculate and report worst Tx beams for all the best Tx/Rx beams. For example, when there are 128 Tx beams, the UE may calculate and report the worst Tx beam for each of the first and 128th best Tx beams. In this case, although control channel overhead increases, the base station collects information on all the worst Tx beams and thus achieves the highest scheduling flexibility. Considering that the number of Rx beams is smaller than the number of Tx beams in general, reporting the worst Tx beams for all the best Tx beams is less efficient than reporting worst Tx beams for all Rx beams in terms of signaling overhead. For example, when there are 4 Rx beams and 128 Tx beams, if the worst Tx beam is reported per Rx beam, a total of 4 worst Tx beam sets may be reported. On the other hand, if the worst Tx beam is reported per Tx beam, a total of 128 worst Tx beam sets should be reported. Thus, if the UE intends to report best Rx beams as well (or if the base station and the UE know the best Rx beams), it is efficient that the UE reports the worst Tx beam for each of the best Rx beams.

It should be understood that the above-described methods are merely exemplary and thus, the best and worst Tx beams may be reported using any combination of the methods. In addition, the base station may inform the UE of a method of calculating/reporting the worst Tx beam, or the UE may autonomously determine a method of calculating/reporting the worst Tx beam and then report the method to the base station.

In addition to the worst Tx beam, the UE may also report the metric value of the worst Tx beam. In this case, the base station may calculate inter-UE interference based on the metric value and perform MU-MIMO scheduling by considering the amount of interference.

In the following, how a UE reports its worst Tx beam(s) will be described.

Method 1 for Reporting Worst Tx Beam

As method 1, the UE may report the worst Tx beam and information on the ranking of the worst Tx beam. As described above, the UE may calculate/report the first to M-th worst Tx beams based on metrics, which are calculated using RSs for beam measurement. For example, when reporting the first to N-th best Tx beams, the UE may calculate/report the first to M-th worst Tx beams for the first best Tx beam and calculate/report the first to M-th worst Tx beams for the second best Tx beam. By continuing this process, the UE may calculate/report the first to M-th worst Tx beams for the N-th best Tx beam.

In this case, since the worst Tx beam may be identified by one of the following: a beam index, an RS indicator, and a time unit index, the reporting of the worst Tx beam may be interpreted to mean that that the UE reports at least one of the beam index, the RS indicator, and the time unit index. By doing so, the UE may inform the base station of both the worst Tx beam and the information on the ranking of the worst Tx beam.

Method 2 for Reporting Worst Tx Beam

The UE may report only the worst Tx beam without information on the ranking of the worst Tx beam.

Specifically, the base station informs the UE of a threshold, and the UE reports every Tx beam with a metric less than or equal to the corresponding threshold without information on the ranking thereof. However, when the UE autonomously configures a threshold, the UE should report the threshold to the base station. For example, when reporting the first to N-th best Tx beams, the UE reports as worst Tx beams all Tx beams with metrics less than or equal to the threshold for each of the best Tx beams. In this case, the UE may report the worst Tx beams using a bitmap. Each bit in the bitmap is one-to-one connected to a Tx beam. When the bit is set to 0, it may indicate that the metric of the Tx beam is more than the threshold. On the contrary, when the bit is set to 1, it may indicate that the metric of the Tx beam is less than or equal to the threshold. For example, assuming that there are 128 Tx beams, the UE may inform worst Tx beams using a 7-bit bitmap for each best Tx beam. In addition, since each of the first to N-th best Tx beams has a bitmap, an N*7-bit payload is required to report the worst Tx beams.

The threshold may be configured independently for each of the first to N-th best Tx beams. For example, when the UE calculates the worst Tx beam for the first best Tx beam, the threshold may be set to 0 dB. When the UE calculates the worst Tx beam for the second best Tx beam, the threshold may be set to −10 dB. Considering the fact that the metric of the first best Tx beam is higher than that of the second best Tx beam, it can be understood that the first best Tx beam causes less interference. Thus, the threshold of the first best Tx beam may be set to be higher than that of the second best Tx beam in order to report more worst Tx beams for the first best Tx beam.

Alternatively, the base station may inform the UE of a threshold, and the UE calculates metric differences between the best Tx beam and all Tx beams and then report every Tx beam of which the metric difference from the best Tx beam is more than or equal to the corresponding threshold without information on the ranking thereof. However, when the UE autonomously configures a threshold, the UE should report the threshold to the base station. For example, when reporting the first to N-th best Tx beams, the UE reports as worst Tx beams all Tx beams of which the metric differences are more than or equal to the threshold for each of the best Tx beams. When the threshold is 10 dB, the UE calculates/reports, as worst Tx beams for the first best Tx beam, all Tx beams of which the metric differences from the first best Tx beam are more than or equal to 10 dB. The UE calculates/reports worst Tx beams for the n-th best Tx beam in the same way.

In this case (that is, when the UE intends to report worst Tx beams without information on rankings thereof), the UE may report the worst Tx beams using a bitmap as described above.

Method 3 for Reporting Worst Tx Beam

By combining Method 1 and Method 2, the UE reports all worst Tx beams less than or equal to a threshold and information on rankings thereof Method 4 for Reporting Worst Tx Beam The UE may report only the number of worst Tx beams. The base station may use the information to determine whether to perform MU scheduling and determine beams themselves. More specifically, the base station indicates to the UE a threshold, and the UE calculates the metrics of Tx beams and calculates/reports the number of Tx beams satisfying the threshold. Although the base station may not know the worst Tx beam for each of the first to N-th best Tx beams, the base station may obtain the number of worst Tx beams for each of the first to N-th best Tx beams. For example, it is assumed that the number of worst Tx beams for the first best Tx beam and the number of worst Tx beams for the second best Tx beam are reported as 2 and 4, respectively. Although the first best beam is most preferred by the UE, the first best beam is less likely to be used for MU-MIMO scheduling since the number of worst Tx beams is low. In other words, MU-MIMO scheduling flexibility is insufficient. On the other hand, the second best beam is not most preferred by the UE, the second best beam is highly likely to be used for MU-MIMO pairing since the number of worst Tx beams is high. By considering the strength and weakness based on the number of worst Tx beams, the base station may determine the final Tx beam and MU-MIMO UE pair.

Meanwhile, methods 1 to 4 may have different pros and cons according to a trade-off between UL overhead and base station scheduling flexibility. The UL overhead decreases in the following order: Method 1→Method 3→Method 2→Method 4, whereas the scheduling flexibility also decreases. Various reporting methods can be implemented by combining the above-described methods. In addition, the base station may inform the UE of a method of calculating/reporting the worst Tx beam, or the UE may autonomously determine a method of calculating/reporting the worst Tx beam and then report the method to the base station.

In the above-described methods, it is proposed to report the worst Tx beam on the basis of the best Tx beam. However, when the UE reports the first to N-th best Rx beams to the base station, the UE may calculate/report the worst Tx beam for each best Rx beam rather than each best Tx beam.

To reduce the UL overhead in the reporting methods, worst Tx beams with high correlation may be predefined as the worst Tx beam group, and the UE may report the group ID of the worst Tx beam group instead of reporting worst Tx beams. For example, when there are K Tx beams (e.g., Tx beams 0, 1, 2, . . . , 127 in the case of K=128), L Tx beams (e.g., L=4) with high correlation may be defined as a group. For example, Tx beam 0 to Tx beam 3 may be defined as group 0, Tx beam 2 to Tx beam 5 may be defined as group 1, and Tx beam 4 to Tx beam 7 may be defined as group 3. That is, four beam with consecutive beam indices may be defined as one group, and the UE may calculate/report the worst Tx beam group for each Tx beam group.

The metric of a Tx beam group may be defined as the (arithmetic or geometric) average of the metrics of Tx beams in the Tx beam group. Alternatively, it may be defined as the lowest (or highest) metric among the metrics of the Tx beams in the Tx beam group. By extending a method of calculating and reporting the N-th worst Tx beam, the UE may calculate and report the n-th worst Tx beam group based on the metric of a Tx beam group. When the worst Tx beam group is configured based on a threshold, the UE may calculate/report a plurality of worst Tx beam groups with metrics satisfying the threshold. If the UE reports the worst Tx beam group as described above, payload size may decrease so that the UL overhead may decrease. In addition, since the worst Tx beam group consists of multiple worst Tx beams, more worst Tx beams are reported to the base station, and thus, the MU-MIMO scheduling flexibility is improved.

Since the base station knows a Tx beam orthogonal or semi-orthogonal to the best Tx beam or a Tx beam that covers a target sector geologically located away from the target sector covered by the best Tx beam, the base station may estimate the worst Tx beam even though the UE does not report the worst Tx beam. However, since such estimation may be inaccurate due to large scale fading of a channel, for example, channel shadowing, the proposed methods may still be useful for the MU-MIMO scheduling.

Figure 13:
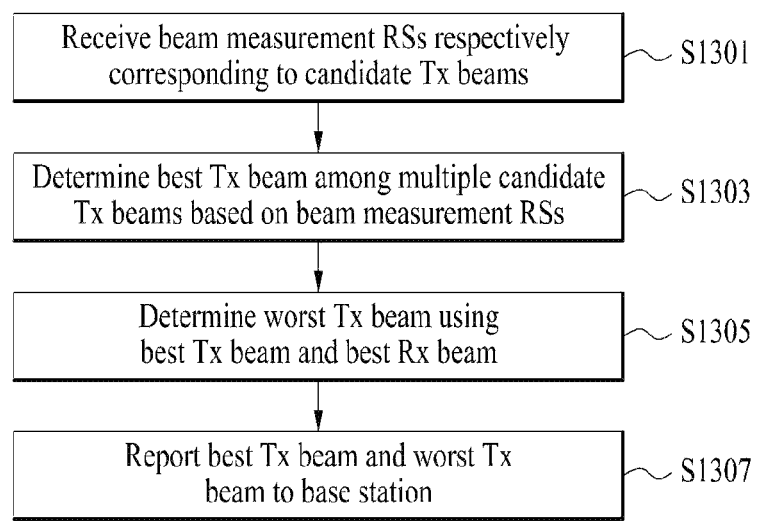
FIG. 13 is a flowchart illustrating an example of reporting beam measurements according to an embodiment of the present disclosure.

FIG. 13 is a flowchart illustrating an example of reporting beam measurements according to an embodiment of the present disclosure.

Referring to FIG. 13, a terminal, i.e., a UE receives beam measurement RSs respectively corresponding to a plurality of candidate Tx beams from a base station in step 1301. As described above, since unlike a normal CSI reporting procedure, the beam management procedure does not require a PMI or an RI and measures only a CQI based on one port, the beam measurement RSs may be RSs, each of which is defined for a single antenna port.

Thereafter, the UE determines at least one best Tx beam among the plurality of candidate Tx beams based on the beam measurement RSs in step 1303. In addition, the UE determines the best Rx beam corresponding to the at least one best Tx beam among candidate Rx beams.

Next, the UE determines at least one worst Tx beam corresponding to the at least one best Tx beam among the plurality of candidate Tx beams according to the above-described method of determining the worst Tx beam in step S1305. In particular, the UE determines, as the at least one worst Tx beam, a Tx beam with a predetermined metric less than or equal to a threshold among the plurality of candidate Tx beams except the at least one best Tx beam by assuming that the at least one best Tx beam and the Rx beam corresponding thereto are applied. In this case, the threshold may be configured to increase as the preference ranking of the at least one best Tx beam increases.

Last, the UE reports information on the at least one best Tx beam and information on the at least one worst Tx beam corresponding to the at least one best Tx beam to the base station according to at least one of reporting methods 1 to 4 in step 1307. In particular, the information on the at least one worst Tx beam corresponding to the at least one best Tx beam may include information on the number of the at least one worst Tx beam. Alternatively, the information on the at least one worst Tx beam corresponding to the at least one best Tx beam may include information on the common worst Tx beam among the at least one worst Tx beam corresponding to the at least one best Tx beam.

Figure 14:
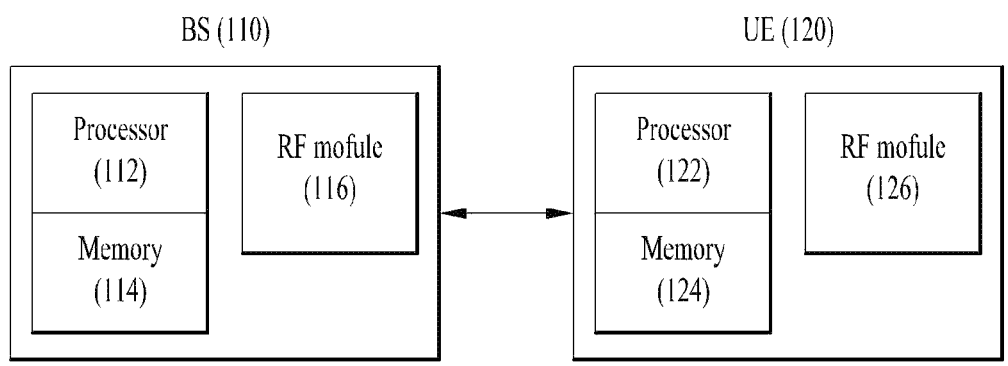
FIG. 14 shows a base station and user equipment applicable to an embodiment of the present invention.

FIG. 14 shows a base station and user equipment applicable to an embodiment of the present disclosure.

Referring to FIG. 14, a wireless communication system includes a Base Station (BS) 110 and a User Equipment (UE) 120. The BS 110 includes a processor 112, a memory 114 and a Radio Frequency (RF) unit 116. The processor 112 may be configured to implement procedures and/or methods proposed by the present disclosure. The memory 114 is connected to the processor 112 and stores various information related to operations of the processor 112. The RF unit 116 is connected to the processor 112 and transmits and/or receives a wireless signal. The UE 120 includes a processor 122, a memory 124 and an RF unit 126. The processor 122 may be configured to implement procedures and/or methods proposed by the present disclosure. The memory 124 is connected to the processor 122 and stores various information related to operations of the processor 122. The RF unit 126 is connected to the processor 122 and transmits and/or receives a wireless signal. The BS 110 and/or UE 120 may have a single antenna or multiple antennas.

The above-described embodiments are proposed by combining constituent components and characteristics of the present disclosure according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present disclosure. The order of operations disclosed in the embodiments of the present disclosure may be changed. Some components or characteristics of any embodiment may also be included in other embodiments or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The memory unit is provided within or outside the processor to exchange data with the processor through the various means known to the public.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

INDUSTRIAL APPLICABILITY

Although the method of reporting beam information for MU-MIMO transmission in a wireless communication system and apparatus therefor are described based on the 3GPP LTE system, the method and apparatus can be applied to various wireless communication systems as well as the 3GPP LTE system.

The invention claimed is:

1. A method of reporting beam information by a User Equipment (UE) to a base station in a wireless communication system, the method comprising:
receiving, from the base station, beam measurement reference signals respectively related to a plurality of candidate transmission beams;
determining at least one best transmission beam among the plurality of candidate transmission beams based on the beam measurement reference signals;
determining, as at least one worst transmission beam related to the at least one best transmission beam, a transmission beam with a predetermined metric less than or equal to a threshold among the plurality of candidate transmission beams except the at least one best transmission beam, based on that the at least one best transmission beam and a best reception beam related to the at least one best transmission beam among candidate reception beams are applied; and
reporting, to the base station, information regarding the at least one best transmission beam and information regarding the at least one worst transmission beam related to the at least one best transmission beam,
wherein the threshold is configured to increase as a preference ranking of the at least one best transmission beam increases,
wherein based on that the information regarding the at least one worst transmission beam includes information regarding all of the at least one worst transmission beam:
(i) the information regarding the at least one worst transmission beam comprises at least one bitmap related to the at least one best transmission beam, and
(ii) a length of the information regarding the at least one worst transmission beam is configured based on a length of the at least one bitmap and a number of the at least one worst transmission beam.

2. The method of claim 1, wherein information regarding the number of the at least one worst transmission beam is reported by the UE to the base station.

3. The method of claim 1, wherein the information regarding the at least one worst transmission beam corresponding to the at least one best transmission beam comprises information regarding a common worst transmission beam among the at least one worst transmission beam related to the at least one best transmission beam.

4. A User Equipment (UE) configured to operate in a wireless communication system, the UE comprising:
a wireless communication module; and
a processor connected to the wireless communication module,
wherein the processor is configured to:
determine at least one best transmission beam among a plurality of candidate transmission beams based on beam measurement reference signals received from a base station, wherein the beam measurement reference signals are related to the plurality of candidate transmission beams, respectively;
determine, as at least one worst transmission beam related to the at least one best transmission beam, a transmission beam with a predetermined metric less than or equal to a threshold among the plurality of candidate transmission beams except the at least one best transmission beam, based on that the at least one best transmission beam and a best reception beam related to the at least one best transmission beam among candidate reception beams are applied; and
control the wireless communication module to report, to the base station, information regarding the at least one best transmission beam and information regarding the at least one worst transmission beam related to the at least one best transmission beam,
wherein the threshold is configured to increase as a preference ranking of the at least one best transmission beam increases,
wherein based on that the information regarding the at least one worst transmission beam includes information regarding all of the at least one worst transmission beam:
(i) the information regarding the at least one worst transmission beam comprises at least one bitmap related to the at least one best transmission beam, and
(ii) a length of the information regarding the at least one worst transmission beam is configured based on a length of the at least one bitmap and a number of the at least one worst transmission beam.

5. The UE of claim 4, wherein information regarding the number of the at least one worst transmission beam is reported by the UE to the base station.

6. The UE of claim 4, wherein the information regarding the at least one worst transmission beam corresponding to the at least one best transmission beam comprises information regarding a common worst transmission beam among the at least one worst transmission beam related to the at least one best transmission beam.

\* \* \* \* \*